US008499984B2

(12) United States Patent
Strand

(10) Patent No.: US 8,499,984 B2
(45) Date of Patent: Aug. 6, 2013

(54) ONE-PIECE TRIGGER CAP FOR A SPRAY DISPENSER

(75) Inventor: Toralf H. Strand, Exeter, NH (US)

(73) Assignee: Summit Packaging Systems, Inc., Manchester, NH (US)

( * ) Notice: Subject to any disclaimer, the term of this patent is extended or adjusted under 35 U.S.C. 154(b) by 530 days.

(21) Appl. No.: 12/306,068

(22) PCT Filed: Jun. 20, 2007

(86) PCT No.: PCT/US2007/014321

§ 371 (c)(1),
(2), (4) Date: Feb. 5, 2009

(87) PCT Pub. No.: WO2007/149459

PCT Pub. Date: Dec. 27, 2007

(65) Prior Publication Data

US 2009/0283609 A1 Nov. 19, 2009

Related U.S. Application Data

(60) Provisional application No. 60/815,608, filed on Jun. 21, 2006.

(51) Int. Cl.

| | |
|---|---|
| ***B65D 83/00*** | (2006.01) |
| ***B65D 88/54*** | (2006.01) |
| ***G01F 11/00*** | (2006.01) |
| ***A01G 25/14*** | (2006.01) |

(52) U.S. Cl.
USPC .............. 222/402.13; 222/321.8; 222/402.15; 222/405; 239/375

(58) Field of Classification Search
USPC ................. 239/333, 375; 222/153.13, 321.8, 222/341, 402.13, 405, 402.15
See application file for complete search history.

(56) References Cited

U.S. PATENT DOCUMENTS

| | | | | |
|---|---|---|---|---|
| 3,478,935 | A | 11/1969 | Brooks | |
| 3,580,432 | A * | 5/1971 | Brooks | 222/402.13 |
| 3,588,040 | A * | 6/1971 | Ward | 251/244 |
| 4,077,549 | A * | 3/1978 | Beard | 222/321.8 |
| 5,018,647 | A * | 5/1991 | Abplanalf | 222/108 |
| 5,597,095 | A * | 1/1997 | Ferrara, Jr. | 222/402.12 |
| 5,992,707 | A * | 11/1999 | Gaichuk | 222/402.13 |
| 6,637,627 | B1 * | 10/2003 | Liljeqvist et al. | 222/402.15 |
| 6,688,792 | B1 * | 2/2004 | Reichmann et al. | 401/34 |
| 2004/0182884 | A1 * | 9/2004 | Tada | 222/153.13 |

FOREIGN PATENT DOCUMENTS

| | | | |
|---|---|---|---|
| DE | 19628055 | A1 | 1/1997 |
| JP | 09 215952 | A | 8/1997 |

* cited by examiner

*Primary Examiner* — Len Tran
*Assistant Examiner* — Ryan Reis
(74) *Attorney, Agent, or Firm* — ZIP Law PLLC; Claire Zopf

(57) ABSTRACT

A finger trigger spray cap actuator for use in conjunction with a mounting cup (11) on an aerosol container including a base (5) having an integral collar (8), a finger trigger support (22); a finger trigger (3) hingedly connected to the trigger support (22), and a finger grip (39) depending from the finger trigger (3) and extending radially beyond the outer circumference of the collar (8). The present invention also relates to a method of manufacturing the finger trigger spray cap assembly including integrally molding a base portion (5) and finger trigger portion (3) as a single unit about a living hinge (10).

11 Claims, 12 Drawing Sheets

ONE-PIECE TRIGGER CAP FOR A SPRAY DISPENSER

This application claims the benefit of U.S. Provisional Application No. 60/815,608, filed Jun. 21, 2006.

FIELD OF THE INVENTION

The present invention relates to an aerosol spray cap or pump spray cap, which is essentially manufactured as one-piece. The one-piece spray cap has two hingedly connected portions and may have a separately inserted nozzle piece to be inserted in an appropriate receiving orifice in one of the portions. More particularly, the aerosol spray cap comprises a trigger actuator having an integral finger trigger, a product passage and a base connected by a living hinge which greatly simplifies the assembly process.

BACKGROUND OF THE INVENTION

Aerosol dispensing containers generally comprise a pressurized canister within which is stored a product to be dispensed as an aerosol. The canister is pressurized, for example, by a propellant which is generally dissolved within the product. The product is released from the canister upon opening of, for example, a pressure actuated valve mechanism located in the top of the canister.

The valve mechanism generally comprises a valve stem defining a passage therethrough which communicates with the interior of the canister, and through which product may flow out of the canister when the valve is appropriately actuated. An orifice is often provided in the wall of the valve stem to provide access from the interior of the container to the passage. The valve stem is normally spring biased to a position in which the orifice is blocked or sealed so the product cannot enter the passage in the valve stem. A valve actuation assembly is generally mounted to the top of a canister to engage with and actuate the valve stem. When the actuation assembly is appropriately triggered, the valve actuation assembly depresses or tilts the valve stem against the biasing force to unblock the orifice and allow the pressurized aerosol product within the canister to enter the passage in the valve stem.

Typically, the actuator assembly is merely a button or the actuator includes a body or housing which is affixed to the top of the canister and an actuator plunger or button is fitted within the housing. The plunger or button generally fits over or within the body in some manner and connects with or at least indirectly engages or actuates the valve stem. A product passage is generally provided for guiding the released aerosol spray out of the spray can and through the valve actuation assembly to the environment. The product passage can be integral with either the body or the button or even be a separate structure which communicates between the valve stem and a product dispensing orifice formed in the actuator.

When the button is depressed by a user, the valve stem is depressed or tilted and as the valve stem is depressed or tilted, the orifice within the valve stem is moved away from the seal and the pressure within the dispensing canister pushes the aerosol product up through the orifice into the valve stem and hence into the passage and then into the product passage. Finally, the product is dispensed via a nozzle out the dispensing orifice.

After dispensing the desired amount of product, the button is released. The spring bias within the valve mechanism provides the restoring or biasing force to return the valve stem to the closed position in which the orifice in the valve stem is sealed and aerosol product is no longer permitted to be dispensed. In some actuators of this type the button is in the form of a finger trigger which extends from a hinge point. In the known actuators of this type the trigger generally is a separate part which is affixed in the assembly process to the hinge point on the body of the actuator. The trigger is thus relatively moveable with respect to the body which may contain the product passage and maintains the product passage immovable relative to the trigger.

Currently, known actuators of this type include many parts which must be separately molded and then assembled. Obviously, the more parts which must be molded the more expensive the manufacture and assembly of such actuators becomes.

OBJECT AND SUMMARY OF THE INVENTION

The proposed one-piece aerosol spray cap is manufactured in a manner which is particularly inexpensive and efficient to assemble in that the spray cap assembly which includes a finger trigger portion and a mounting cup engaging base portion are integrally manufactured, i.e., molded, in a manner such that the trigger portion and base portion are integrally connected by a living hinge. The finger trigger portion is rotatable relative to the base portion about the living hinge, and the trigger portion is also provided with a down tube which engages through a central opening in the mounting cup engaging base portion. The central opening further facilitates keeping the down tube in a vertical or axial alignment and motion. The end of the down tube is then in communication with a valve stem extending at least partially therethrough.

It is to be appreciated that with the mounting cup engaging base portion is securely fitted or mounted to the mounting cup as is generally known in the art, the integrally connected finger trigger portion can be moved relative thereto about the living hinge. Spring bias is provided to the trigger portion by the valve stem in communication with the end of the down tube. For actuation of the finger trigger, and hence release of pressurized product from the container, a user pulls or forces the finger trigger portion downwards relative to the mounting cup engaging base portion such that the valve stem is depressed and fluid is ejected from the valve in the mounting cup, through the product outlet passage in the down tube and out through a nozzle fitted in the trigger portion of the spray cap assembly.

It is an object of the present invention to provide an economical and easy to manufacture and assembly one-piece aerosol spray cap trigger assembly.

Another object of the present invention is to provide that the one-piece aerosol spray cap comprises an integral base and trigger assembly and in some cases a separate nozzle piece for insertion therein.

A further object of the present invention is to form the integral trigger and base assembly connected via a living hinge which provides for relative movement between a finger trigger portion and a mounting cup engaging portion of the aerosol spray cap.

Yet another object of the present invention is to provide that the finger trigger assembly includes a down tube portion which engages with an appropriately designed opening in the base assembly for communicating with a valve of a mounting cup on an aerosol spray can.

The present invention also relates to a finger trigger spray cap actuator for use in conjunction with a mounting cup on an aerosol container, the actuator comprising, a base having an integral collar, a finger trigger support; a finger trigger hingedly connected to the trigger support; and a finger grip depending from the finger trigger and extending radially beyond the outer circumference of the collar.

The present invention also relates to a method of manufacturing a finger trigger spray cap assembly, the method comprising the steps of integrally molding a base portion and finger trigger portion as a single unit about a living hinge, the base portion comprising a collar for being supported on a mounting cup of a container and an integral trigger support defining a central passage through the base portion, forming a product outlet passage and an outlet orifice in the finger trigger portion for connecting directly with a valve stem situated in a mounting cup.

BRIEF DESCRIPTION OF THE DRAWINGS

The invention will now be described, by way of example, with reference to the accompanying drawings in which.

DETAILED DESCRIPTION OF THE INVENTION

Figure 1:
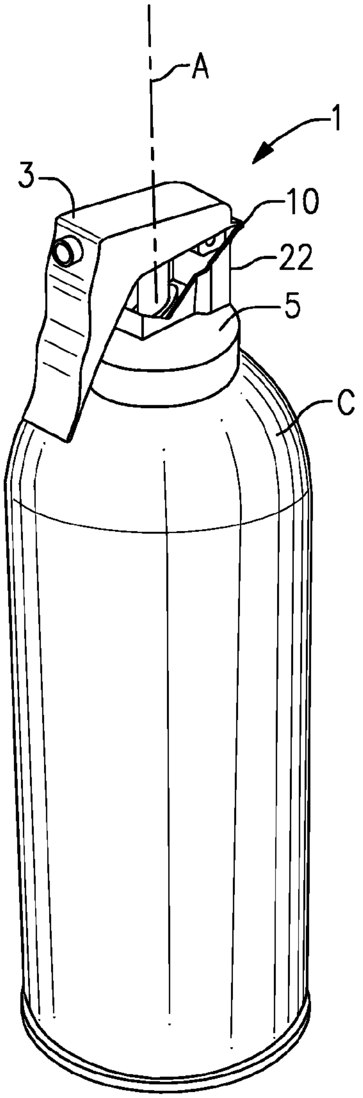
FIG. 1 is a perspective view of a one-piece aerosol trigger spray cap mounted on a aerosol spray can.

Observing FIG. 1, is a perspective view of the one-piece aerosol spray cap actuator 1 mounted on an aerosol spray can C. By way of general explanation, the one-piece aerosol spray cap provides for an integral finger trigger portion 3, a trigger support 22 and a mounting cup engaging base 5. The finger trigger portion 3, trigger support 22 and the base 5 are integrally connected via a living hinge 10 along a rear wall of the spray cap actuator 1. To utilize the aerosol spray can C with the below described spray cap actuator 1 a user wraps their hand around spray can C as well as the spray cap actuator 1 in a manner so that the thumb and palm support the back and sides of the actuator 1, while the fingers generally wrap around the front of the spray cap to engage the finger trigger portion 3. Squeezing the finger trigger portion 3 with the fingers will move the finger trigger portion 3 about the living hinge 10 relative to the trigger support 22 and the base, thus pressing down on and actuating a valve stem V in the aerosol spray can C to dispense the aerosol product contained in the spray can C.

Figure 2:
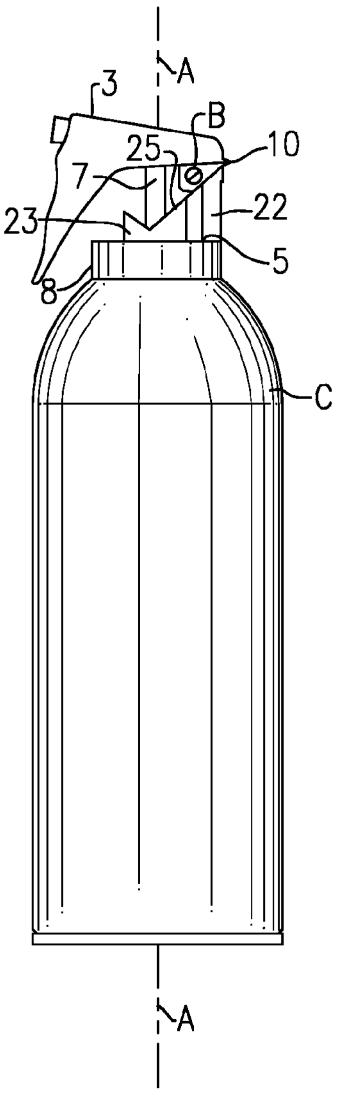
FIG. 2 is a side view of the one-piece aerosol trigger spray cap in conjunction with the aerosol spray can.

Observing the side view of FIG. 2 it is readily observed that the base 5 of the aerosol spray cap has a collar 8 which is supported on top of the aerosol spray can C and is secured to and circumferentially engages around the mounting cup M as will be shown and discussed in further detail below. The base 5 also includes a V-shaped trigger support 22 above the collar 8 and extending substantially vertically upwards therefrom to generally support the relatively moveable finger trigger portion 3. As will be explained in greater detail below, the V-shaped trigger support 22 also facilitates the downward engagement of a down tube 7 of the finger trigger portion 3 through a central opening 9 in the base 5 located at the lowermost apex portion of the V-shaped trigger support 22.

Figure 3:
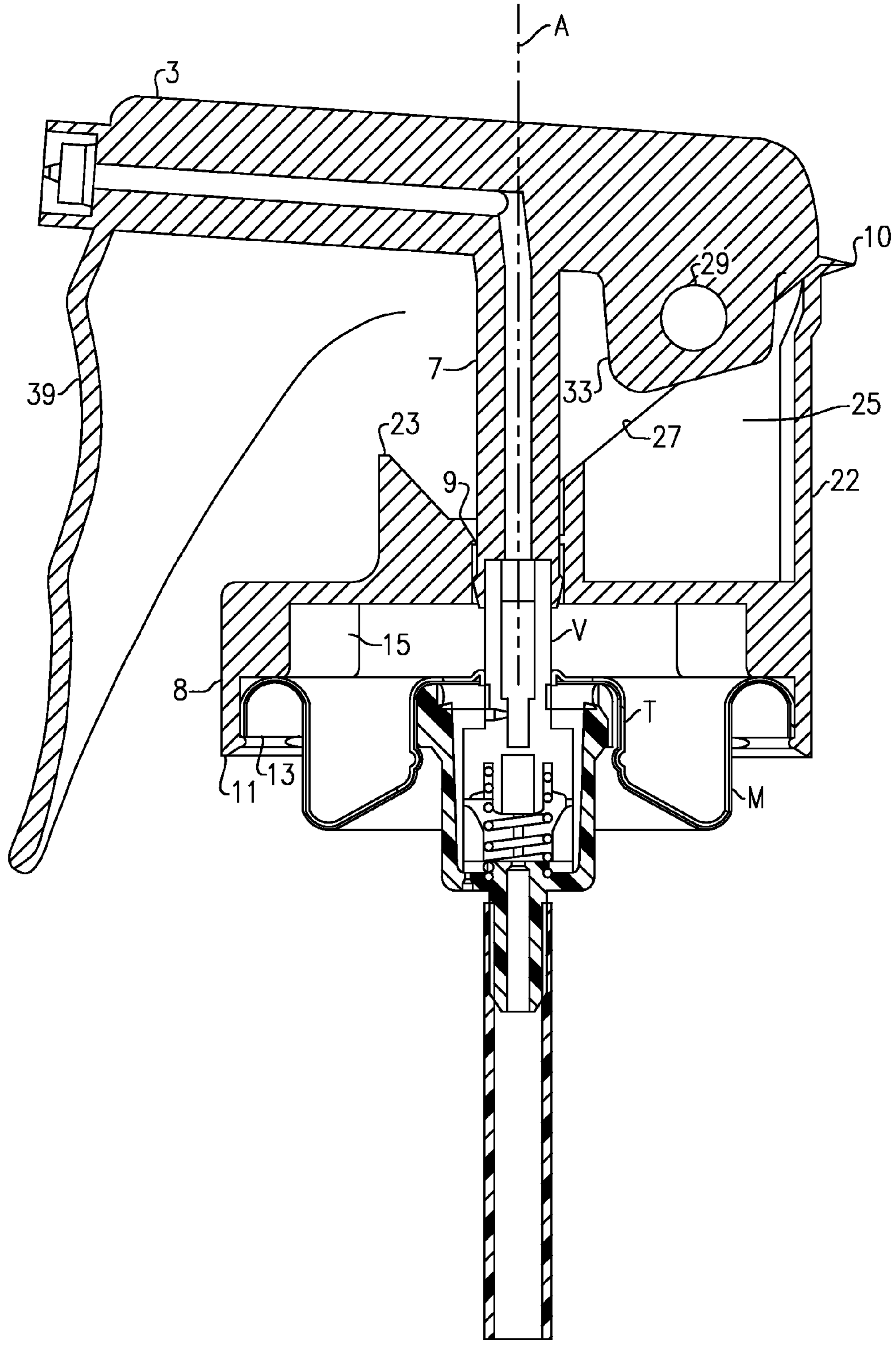
FIG. 3 is a cross-sectional side view of the one-piece aerosol trigger spray cap in a closed, operable position in conjunction with the mounting cup of an aerosol spray can.

Turning now to FIG. 3 a more complete discussion of the spray cap actuator 1 will be discussed in light of the cross-section view of the actuator 1 as shown attached and supported on the mounting cup M. The V-shaped trigger support 22 is defined by a front portion 23 which is a downward and rearward sloping surface being a shorter side of the V-shaped profile. A rear portion 25 of the V-shaped trigger support 22 comprises a pair of longer downward and forward sloping sides 27 which roughly intersect with the front portion 23 and so form the lower apex portion of the V-shaped trigger support 22. The area between the sloping sides 27 of the rear portion 25 of the trigger support 22 is generally open or hollow so as to allow for an alignment stub 33 of the trigger portion 3 to be inserted therein. The sloping sides 27 of the rear portion 25 extend downwards from a higher end on which is integrally formed the living hinge 10 for connecting the trigger to the V-shaped trigger support 22 and the central opening 9 in the base 5.

A barrel lock or pin B may be provided in the hole 29 shown in the finger trigger portion 3 of the present embodiment to prevent inadvertent actuation of the trigger portion 3. A barrel lock or pin B (seen in FIG. 2) in a locked position would extend horizontally over the sloping sides 27 of the rear portion 25 to keep the trigger portion 3 from being depressed. In an unlocked position the barrel lock or pin B would either be removed from the hole, or pushed into the hole so that upon actuation of the trigger portion 3 is allowed to depress into the hollow area between the sloping sides 27. Different from the sloping sides 27 and hollow rear portion 25, the front portion 23 is generally a solid surface which forms a ramp 24 down towards the central opening 9 in order to properly align the down tube 7 of the finger trigger portion 3 with the central opening 9 and the valve of the mounting cup M. As is to be appreciated, the solid surface of the ramp 24 front portion 23 of the V-shaped trigger support 22 assists in directing the down tube 7 into the central opening so that the down tube 7 can engage and communicate with the valve stem V.

The collar 8 comprises a lower circumferential edge 11 and an inner surface having a lip 13. The lip 13 extends circumferentially, or partially circumferentially i.e., segmented, around the inner surface of the collar 8. The lip 13 is provided in order to frictionally engage underneath the outer rim or edge of the mounting cup M as is shown in the figure and generally well known in the art. The collar 8 is further provided with a step 15 which directly engages the outside rim and upper edge of the mounting cup M. The step 15 may be formed partially segmented as in a series of ribs, or fully circumferentially around the inner surface of the collar 8. A top inner surface of the collar 8 lies spaced above the top of the mounting cup M and provides an inner space above the central turret T of the mounting cup M which holds the valve actuator 21.

The central opening 9 communicates straight through the collar 8 between the apex portion formed by the trigger support 22 and communicates with the inner space above the central turret T of the mounting cup M. The central opening 9 is preferably sized to accept the down tube 7 therethrough when the trigger portion 3 is rotated into the operable position. The central opening 9 is formed with a slightly larger diameter than the down tube 7 extending from the finger trigger portion 3 so as to have at least a sliding fit therewith. It is to be appreciated that the central opening does not have to directly engage the down tube, but can be significantly larger than the down tube as well.

In the operable position, the down tube 7 extends along and in line with the longitudinal axis A of the aerosol spray container and valve stem V. The entry of the down tube 7 into the central opening 9 is facilitated by the front portion 23 of the V-shaped trigger support 22 formed as a substantially solid triangular element extending upwards relative to the collar 8. The front portion 23 defines the guide surface which slopes downwards towards the central opening 9. The front portion 23 does not have to be solid as shown but could also be partially hollow if necessary to save weight or material. As previously discussed, the rear portion 25 of the V-shaped trigger support 22, which also has a triangular profile, is formed substantially hollow having opposing sides with sloping edges defining an upward facing opening. The opening allows for the passage and insertion of the depending alignment stub 33, or guide of the trigger to be discussed in further detail below.

It is an important aspect of the present invention that the down tube 7 be provided with sufficient flexibility, especially at an anchoring point, or connection point with the underside of the trigger to flex in a manner as dictated by the sliding fit with the central opening 9. In other words, although the trigger is rotating about the hinge 10, it is not beneficial where the down tube acts in any other direction other than axially i.e., straight up and down, along the axis A. Any excess radial movement of the down tube 7 corresponding to the rotation of the trigger portion 3 will cause a radial force on the valve stem V. This can lead to an unacceptable condition known as blow-by, where the pressurized product escapes between the valve stem V and the valve gasket inside the valve itself.

Figure 5A:
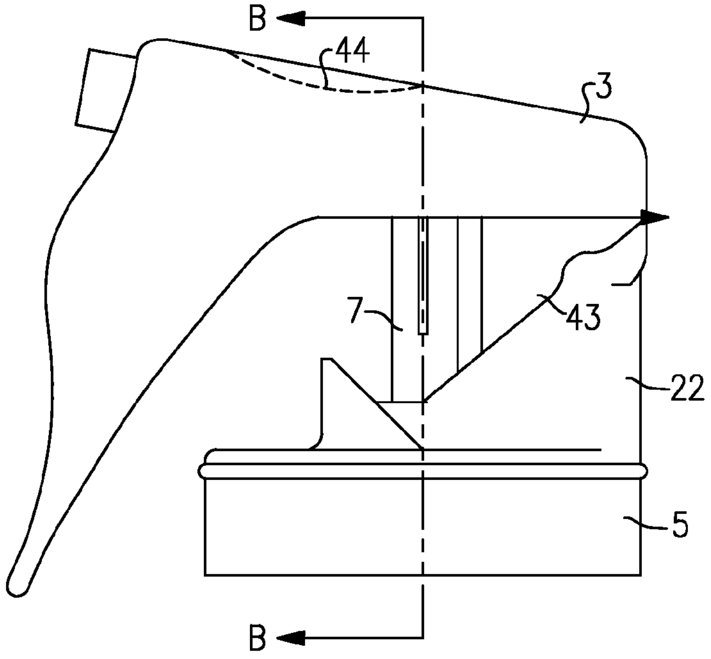
FIG. 5A is a side view of a second embodiment of the one-piece aerosol trigger spray cap.
Figure 5B:
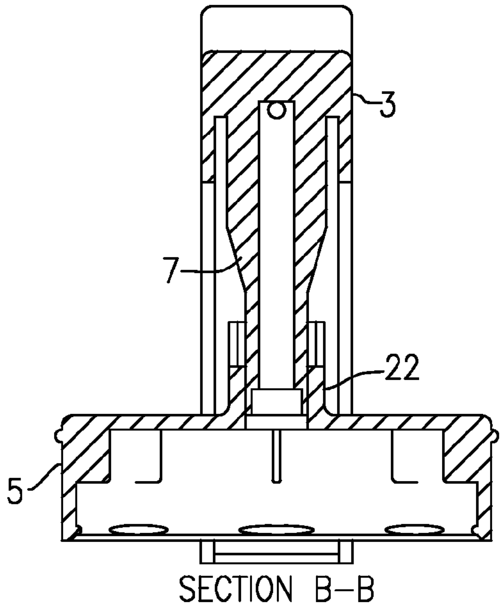
FIG. 5B is a rear cross-sectional view of the second embodiment of the one-piece aerosol trigger spray cap.
Figure 6A:
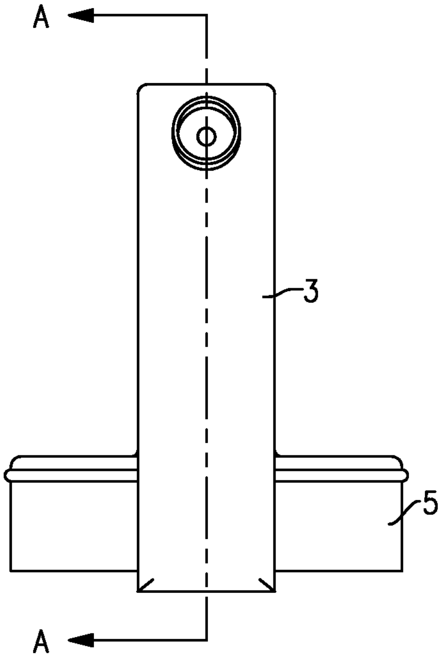
FIG. 6A is a front view of the second embodiment of the one-piece aerosol trigger spray cap.
Figure 6B:
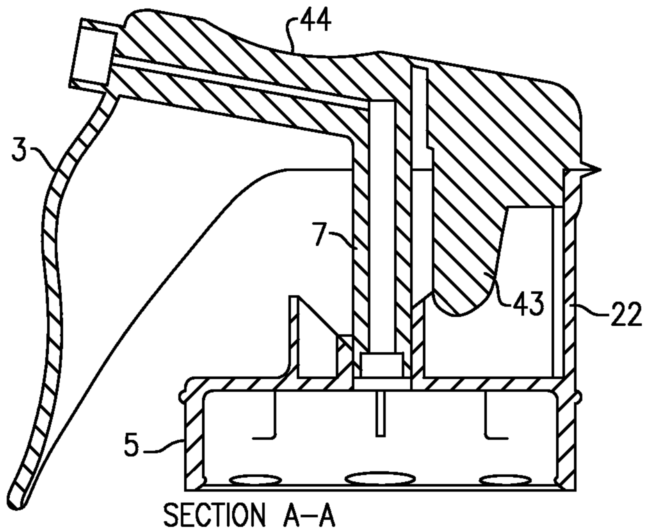
FIG. 6B is a side cross-sectional view of the second embodiment of the one-piece aerosol trigger spray cap.
Figure 7:
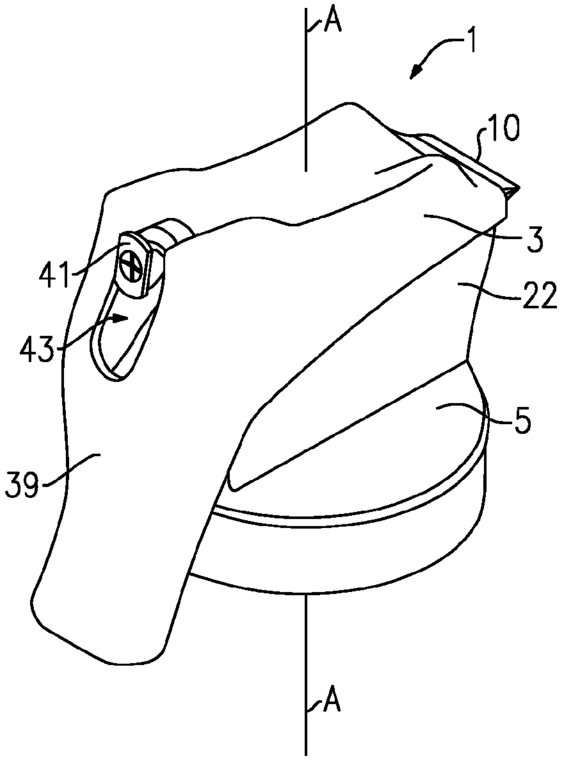
FIG. 7 is a perspective view of a third embodiment of the one-piece aerosol trigger spray cap.
Figure 8:
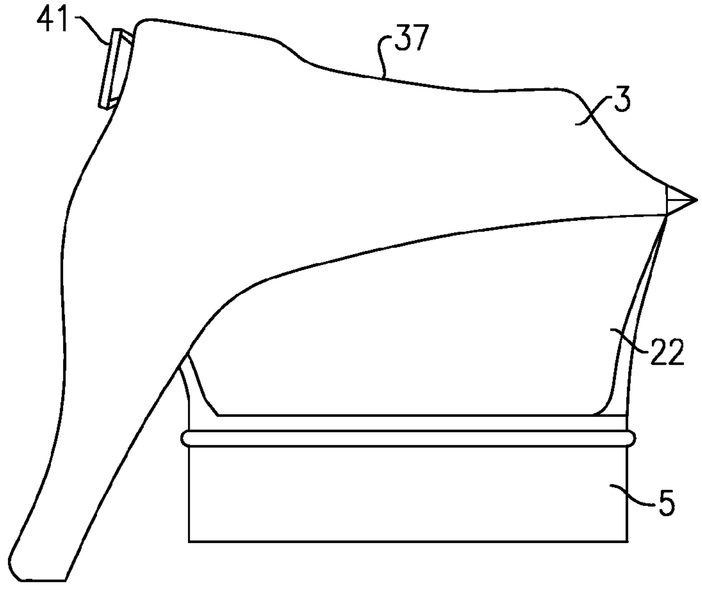
FIG. 8 is a side view of the one-piece aerosol trigger spray cap in the third embodiment.
Figure 9:
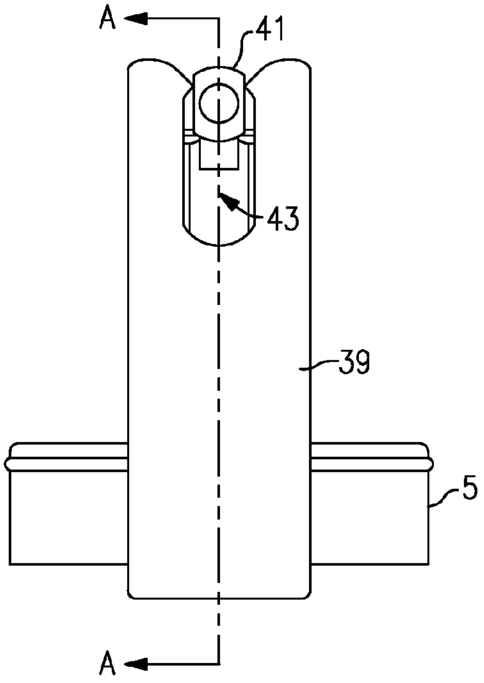
FIG. 9 is a front view of the one-piece aerosol trigger spray cap in the third embodiment.

Still observing FIG. 3, the following discussion pertains to the finger trigger portion 3 of the spray cap actuator 1. The finger trigger portion 3 has a rear guide section which is integrally connected via the living hinge 10 to the rear portion 25 of the trigger support 22. The rear guide includes the depending alignment stub 33 which depends downwardly from the trigger portion 3 and can be provided with the barrel lock B or pin as discussed above. When the spray cap actuator 1 is in an operable and unlocked position, the alignment stub 33 is maintained in a slidable engagement within the hollow space defined between the sloping sides 27 of the rear portion 25 of the trigger support 22. It is to be appreciated as shown in FIG. 5. that the alignment stub 33 may also depend sufficiently downwards to the extent that it acts as a stop to prohibit the over rotation of the finger trigger portion 3 during actuation.

In the operable position as shown in FIG. 3 with the spray cap engaged with the aerosol spray can C, mounting cup M and valve, the trigger portion 3 extends substantially perpendicularly from the integral connection with the living hinge 10 relative to the vertical axis A of the spray can C and spray cap actuator 1. This alignment in the operable, but unactuated position, is maintained by the interaction of the living hinge 10 which provides an inherent upward bias on the finger trigger portion 3. Opposing this, the frictional engagement of the down tube 7 in the central opening 9 maintains the down tube 7 in connection with the valve stem V against the upward bias potentially provided by the living hinge 10. Again, the down tube 7 may be held in engagement with the valve stem V by other means besides the frictional contact of the central opening 9, thus in other embodiments permitting the central opening 9 to be substantially larger than the down tube 7.

Figure 4:
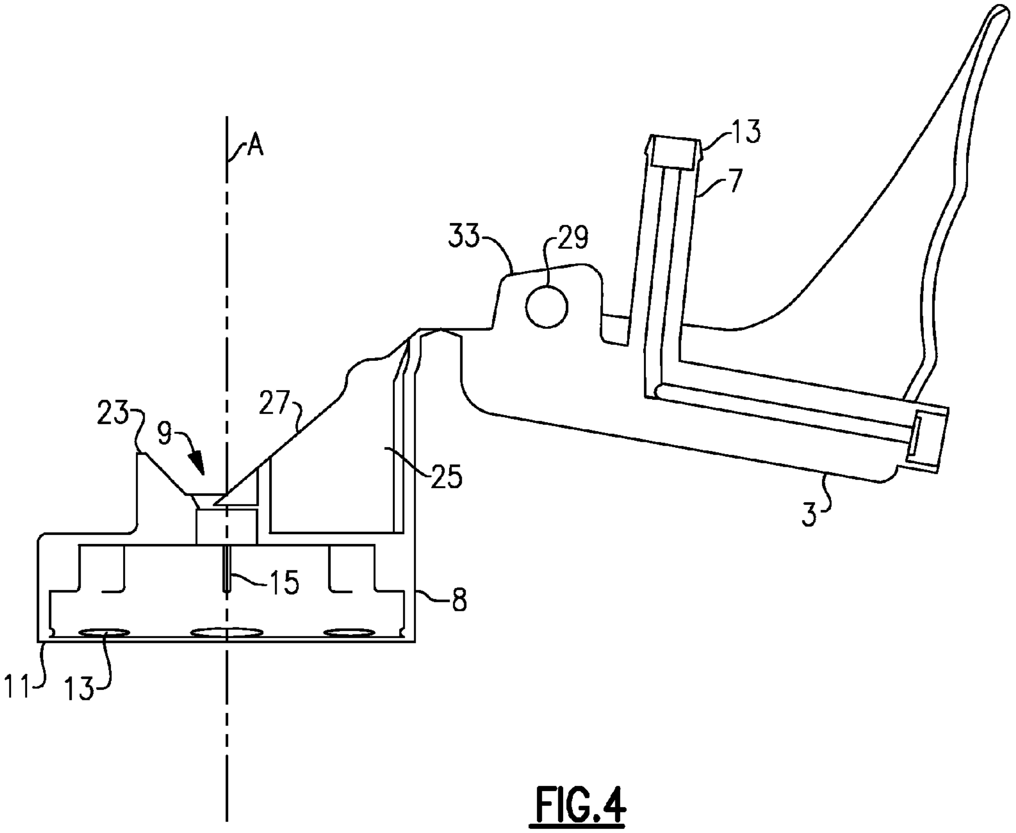
FIG. 4 is the finger trigger spray cap assembly shown in the open position in which it is molded.

Turning to FIG. 4, the finger trigger actuator is shown by itself. For instance, a non-operable position wherein the finger trigger is folded outward and back from the lower base. As can be readily appreciated by those of skill in the art, as a one-piece, molded actuator, the structure is such that this actuator can be assembled either perhaps by a trained worker, or even by the consumer themselves where it is merely a matter of simply rotating the finger trigger portion 3 over the base 5 and interlocking the down tube 7 with the respective throughbore or central opening 9 of the base 5 in order to bring the actuator into a working arrangement. With such a simple one-piece design, it is important that the only thing which must be undertaken as far as assembly is that in certain cases a nozzle is inserted into the nozzle engaging recess at the end of the product passage 35 in the trigger actuator.

The spray cap actuator 1 is generally molded in a manner which provides the finger trigger portion 3 and the base of the spray cap actuator 1 in a neutral, opened and unbiased, configuration as shown in FIG. 4. As can be appreciated, when the trigger portion 3 is rotated about the living hinge 10 relative to the neutral position towards a more closed position, i.e., the operable position, the living hinge 10 provides for an inherent bias in such a manner so that the hinge wants to return the trigger portion 3 and base to the open neutral position. Thus, as the trigger portion 3 is rotated relative to the base towards a closed position these elements are in alignment due to the living hinge. Furthermore, the down tube 7 is engaged in or through the central opening 9 and the assembly is thus greatly simplified. This assembly step can be desirably accomplished during the molding process but can also be done as a second step.

Returning to FIG. 3, in the closed or operable position the down tube 7 is inserted at least part way into the central opening 9 and an outer lip 13 formed near the end of the down tube 7 is pushed past a circumferential shelf formed about the inner wall of the central opening 9. In general, the outer lip 13 has a diameter which is larger than the diameter of the shelf so that once the parts are forced past one another the above described bias cannot disengage the down tube 7 from such a slidable engagement in the central opening 9.

As the trigger portion 3 is rotated against the bias of the living hinge 10 from the neutral open position to the closed position and the down tube 7 is brought into engagement with the central opening 9 in the base, the depending alignment stub 33 is inserted into the opening and hollow area defined by the sloping sides 27 in the rear portion 25 of the V-shaped trigger support 22. This alignment stub 33 is constrained in a lateral, i.e., side to side manner by the sloping sides 27 of the rear portion 25. In this way, the trigger portion 3 is maintained in both a substantially perpendicular and a lateral alignment with the base and the vertical axis A and it does not twist to the side when a user squeezes the finger trigger portion 3. As can be appreciated, the depending alignment stub 33 is located adjacent the living hinge 10 area and is provided downwardly depending in such a manner that at some point in the arcuate actuation of the finger trigger portion 3, the stub 33 will impact the trigger support 22 in order to stop further movement of the trigger actuator and hence the valve stem V.

Figure 12:
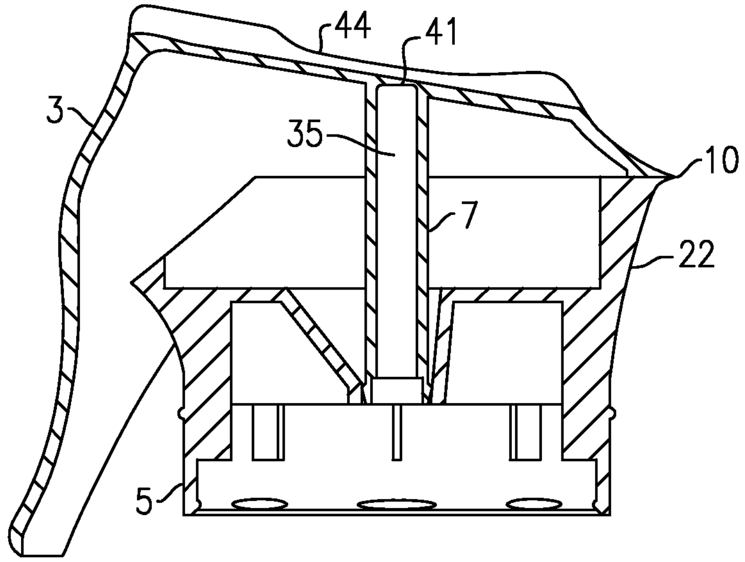
FIG. 12 is a cross-sectional view of the one-piece aerosol trigger spray cap having a vertically directed product outlet.

When the down tube 7 is connected in the central opening 9 of the base 5 the trigger actuator is in a working operable position as best shown in FIG. 3. The down tube 7 extends substantially longitudinally downward along the axis A in order to pass into and be engaged in the central opening 9. With the base being supported on a mounting cup M, a product passage 35 in the down tube 7 communicates directly with a corresponding passage in the springably biased valve stem V of the aerosol container. The product passage 35 extends generally vertically upwards along the axis A from the valve stem V and then turns substantially horizontally to a product outlet passage extending through the finger trigger portion 3 which in turn extends to a product orifice and nozzle 41 for dispensing the aerosol product to the environment. It is also to be appreciated that the product orifice and nozzle 41 could be formed in the top of the trigger portion 3. In other words, the product passage 35 does not have a horizontal component, but instead extends axially up and directly out a product orifice or nozzle formed in the top of the trigger portion 3 coaxially with the vertical axis A as seen in FIG. 12.

From a point adjacent the horizontally aligned product outlet orifice, the finger trigger extends downward and defines a front wall 39 which includes ergonomically designed finger grip surfaces and supporting sidewalls 45 which extend upwards from a lowermost edge of the finger grip to coincide with and provide support on the body portion of the finger trigger portion 3. The sidewalls 45 extend upwards at such an angle from the lower edge of the finger grip that the edges thereof do not interfere in any manner with the base or aerosol spray can C during normal operations. A depression 37 may also be formed in a top surface of the trigger portion 3 in order to facilitate a user to push down on the trigger portion 3 as opposed to squeezing the finger trigger itself.

In the event that the spray cap or nozzle becomes clogged it is another important aspect of the present invention that is a user may merely flip or rotates the trigger actuator portion 3 open so that the down tube 7 is disengaged from the central opening 9 and access is provided to both the product passage as well as the valve stem V for purposes of cleaning the same. Once cleaning is complete the trigger actuator portion 3 is returned to the operable position so that the surface forming the V-shaped portion guides the down tube 7 into engagement with the central opening 9 and also the valve stem V extending at least partially therethrough. After this simple action, the aerosol spray cap actuator 1 is now ready for actuation.

FIGS. 5A, 5B, 6A and 6B are a slightly different embodiment having a depending stub 43 which depends further downwards and closer to the top surface of the collar 8. A depression 44 may be provided in the top surface of the finger trigger so as to permit conventional push-button type operation of the actuator 1.

A further embodiment of the invention is disclosed in FIGS. 7-10 and similar to the previously disclosed embodiments, the spray cap actuator 1 of this embodiment includes the finger trigger portion 3 supported and contiguously attached via the living hinge 10 to the trigger support 22 and the base 5. The presently disclosed spray cap actuator 1 may be used for example with an aerosolized paint product, and includes a cutout 43 formed in a front wall 39 of the finger trigger portion 3. The cut out 43 is formed below and adjacent the product orifice and nozzle 41 and extends completely through the front of the finger trigger portion 3. The cut out 43 is formed on top of a slightly outwardly, i.e., radially, bulged portion of the front wall 39 of the finger trigger and thus the cut out 43 forms both a radial and axial opening, relative to the axis A, directly below the product orifice 41. The purpose of this cut out 43 adjacent the product orifice 41 is to ensure that any drips or accumulations on the end of the nozzle 41 will not fall onto or drip down the outer surface of the front wall 39 of the finger trigger portion 3, but instead will fall through the cut out 43 and be directed away from the user's hand. A depression 37 may also be formed in a top surface of the trigger portion 3 in order to facilitate a user to push down on the trigger portion 3 as opposed to squeezing the finger trigger itself.

Figure 10:
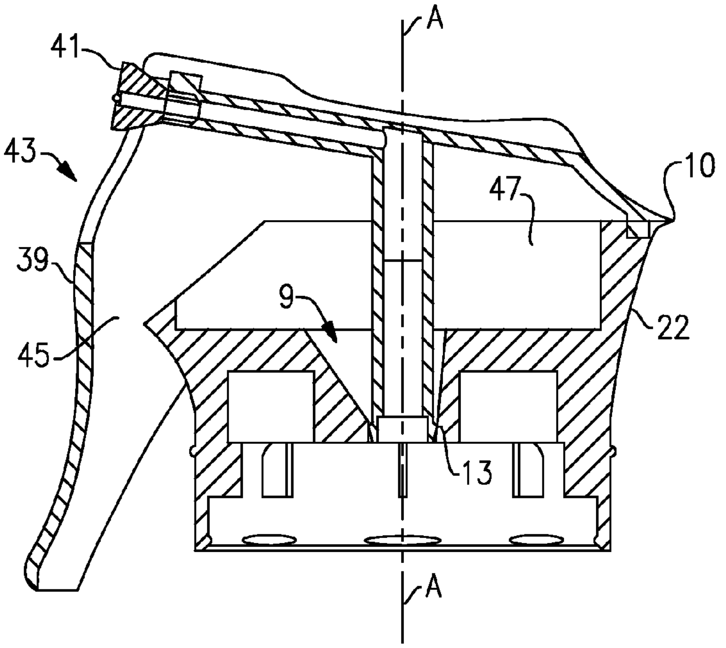
FIG. 10 is a side cross-sectional view of the one-piece aerosol trigger spray cap in the third embodiment.

Observing the cross-section of FIG. 10, the finger trigger portion 3 is further provided in this embodiment without the mass of material between the down tube 7 and the living hinge 10 as seen in the previous embodiments. The elimination of the mass of material for example the guide stub 33 as shown in previous FIG. 3, on this portion of the finger trigger portion 3 provides further relative radial flexibility of the down tube 7 by eliminating the material around the flexible anchoring point of the down tube 7. As discussed above it is imperative that the down tube 7 have some flexibility so that it may be appropriately guided by the central opening 9 in a linear, i.e., vertical or axial manner so that sufficient contact is maintained between the lower end of the down tube 7 and the valve stem V on the spray can C. As also discussed above, the flexibility ensures that radial misalignment between the down tube 7 and the valve stem V is at a minimum in order to eliminate the issue of blow-by.

In this embodiment, the trigger support 22 and the trigger support sidewalls 47 are positioned within the trigger sidewalls 45 of the trigger portion 3 to assist in guiding the movement of the trigger portion 3 when it is moved relative to the base 5. Similar to the previous embodiments a central opening 9 is formed through a bottom of the trigger support 22 and provides access for the down tube 7 to pass therethrough and engage with the valve stem V. The surfaces leading to the central opening 9 is similar to the above noted V-shaped groove in that the present embodiment also has angular, sloped sidewalls including a front sloped sidewall portion 23 and rear sloped sidewall portion 25 which direct the down tube 7 towards engagement with the central opening 9 as previously described. The front sloped sidewall portion 23 is angled to a significantly greater degree than the rear sloped sidewall portion 25 as the front sloped sidewall portion 23 provides more direct contact and guidance to the down tube 7 when the trigger portion, and hence the down tube 7 are rotated into an operable position with the down tube 7 engaged in the central opening 9.

In the closed or operable position the down tube 7 is inserted at least part way into the central opening 9 and an outer lip 13 formed near the end of the down tube 7 is pushed past a circumferential shelf or ring formed about the inner wall of the central opening 9. It may also be that a bottom of the central opening 9 is sized so as to be slightly smaller than the outer lip 13 formed on the down tube 7. In general, the outer lip 13 has a diameter which is larger than the diameter of the shelf or ring or bottom of the central opening 9 so that once the parts are forced past one another the above described bias cannot disengage the down tube 7 from the slidable engagement in the central opening 9.

Figure 11:
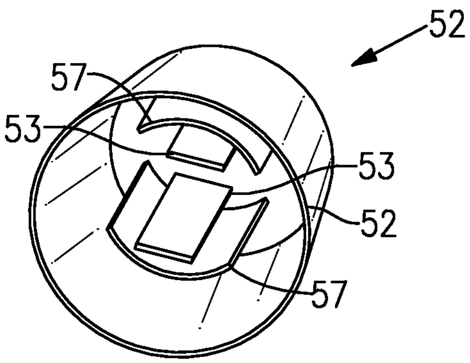
FIG. 11 is a perspective view of an overcap for use with the one-piece aerosol trigger spray cap as disclosed by the present invention.

Turning to FIG. 11, in some cases for example where a spray cap actuator 1 of the present invention is utilized with an aerosolized painting product, it is possible to provide an overcap 51 for the spray cap actuator 1, for instance to protect the actuator 1, indicate color or align the actuator 1 in a desired manner with respect to the graphics and/or content of the can C. An overcap 51 for such a product generally has an outer shell 52 containing a number of supporting walls, specifically a pair of outer supporting walls 57 and a pair of inner supporting walls 53. These supporting walls 53, 57 are formed therein to support and align the overcap 51 relative to the aerosol can C as well as the spray cap actuator 1. In terms of manufacturing, a single-piece spray cap actuator 1 as disclosed above may be inserted within such an overcap 51 subsequent to the actuator 1 being manufactured and closed into the operable position. The entire unit of the one-piece spray cap actuator 1 inserted in the protective overcap 51 may then be placed in a single operation upon a product spray can C.

Figure 13A:
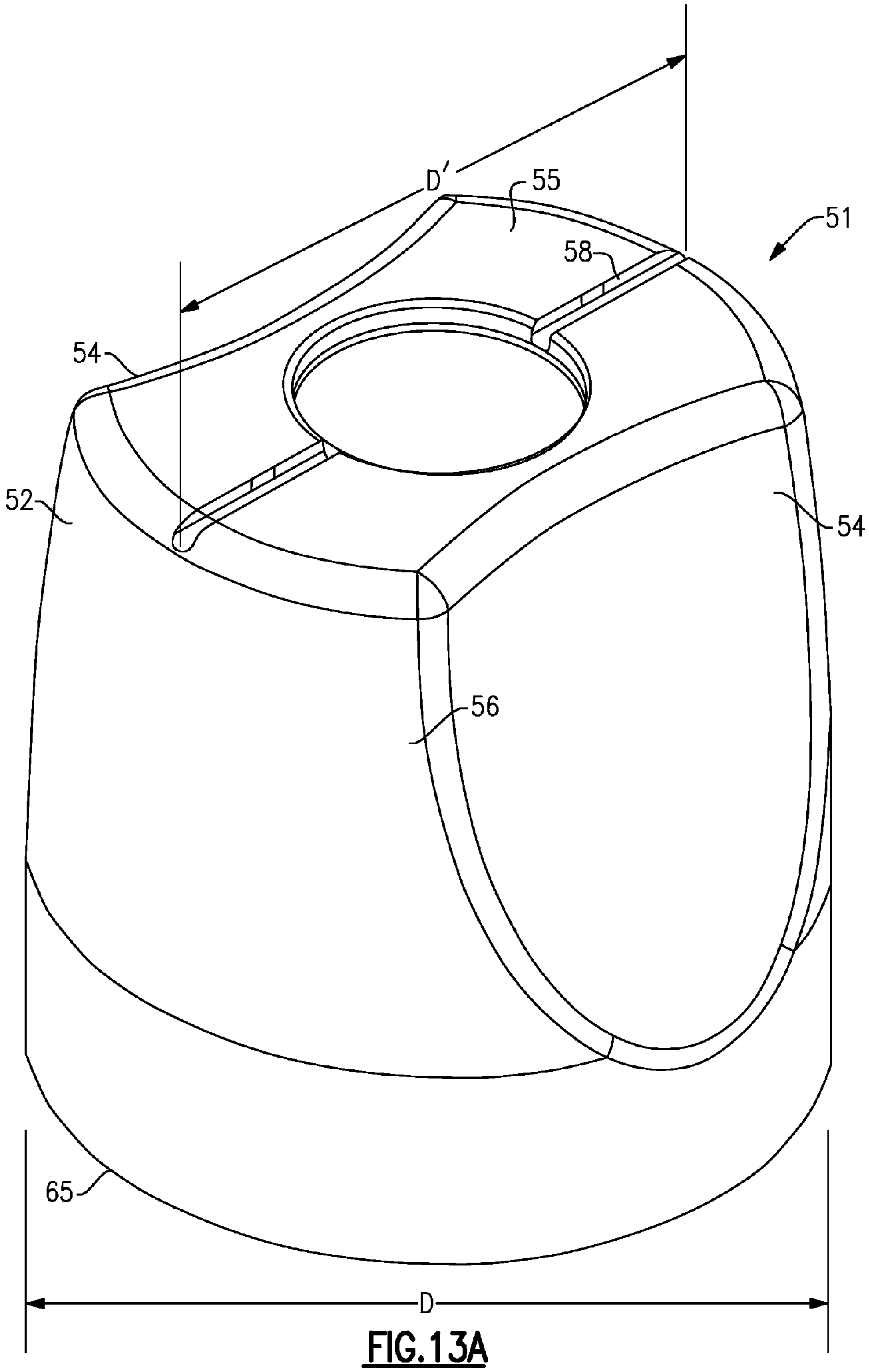
FIG. 13A is a perspective view of another embodiment of an actuator overcap.

Observing FIG. 13A, the overcap 51 is shown having the outer shell 52 formed with a pair of opposing scalloped sides 54 formed in the circumferential sidewall 56 of the shell 52. Also, a narrow linear channel 58 may be formed in the top 55 of the shell 52 to engage for example a product dispensing straw (not shown) as is known in the art. The circumferential sidewall 56 of shell 52 has a decreasing diameter between the diameter D of a lower edge 65 of the shell 52 and a diameter D' of the top 55 of the shell. This decreasing diameter facilitates the stackability of the overcaps 51 as discussed in further detail below.

Figure 13B:
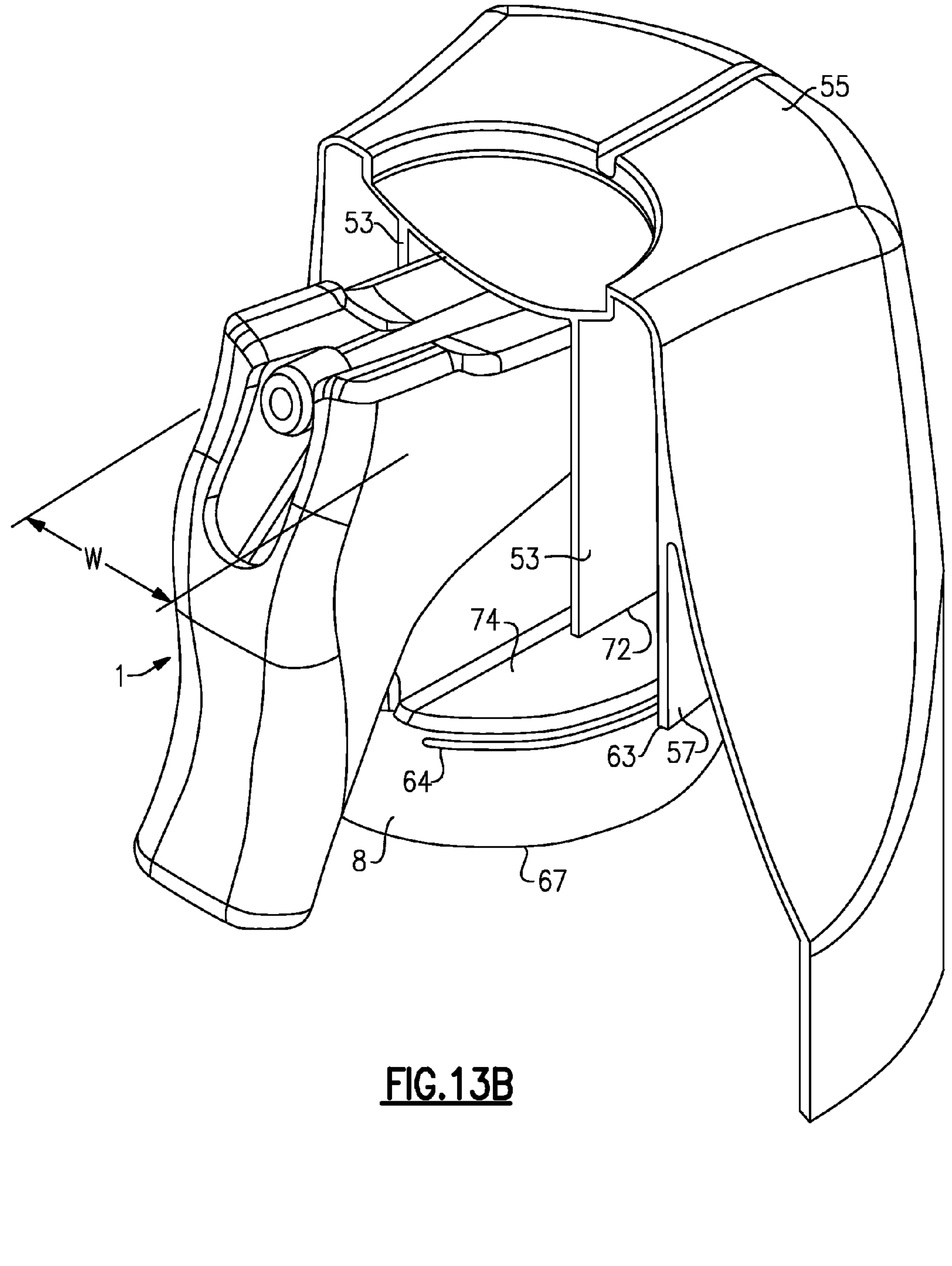
FIG. 13B is a perspective cross-sectional view of the actuator overcap in combination with the one-piece aerosol trigger spray cap.

In FIG. 13B, the actuator 1 is shown inserted within the overcap 51. A pair of inner support walls 53 and a pair of outer support walls 57 depend downwards from the inner side of the top 55 of the overcap 51. Each inner support wall 53 is shorter in length than the outer support wall 57, and is radially spaced from the center of the overcap 51 to an extent which is less than the diameter of the base 5 of the actuator 1. Additionally, the length of the inner support wall 53 is determined so that the lower most edge 72 of the inner support wall 53 will abut on a desired surface of the actuator 1, preferably on a static surface which is not part of the trigger mechanism of the actuator, for example a surface 74 of the base 5 of the actuator 1. Such an arrangement ensures that any vertical force imparted to the outside or top 55 of the actuator overcap 51 is directed onto a part of the actuator 1, e.g. the base 5, which is not part of the trigger mechanism.

Each of the outer support wall(s) 57 are radially spaced from the respective inner support wall 53 and spaced apart from one another substantially the same difference as a width, i.e. the diameter, of the spray cap actuator base 5 so as to generally frictionally engage the base 5 of the actuator 1. The outer support walls 57 may include a lower lip 63 which has a snap fit or frictionally biased engagement with an associated slot or lip 64 formed on an outer surface of the collar 8 or base 5 of the spray cap actuator itself. Thus, besides the spray cap actuator 1 being oriented in a desired direction and axially abutting the inner support walls 53, the actuator is radially and axially secured within the actuator overcap 51 by the snap fitting of the lower lip 63 onto the actuator base 5 and the respective abutment of the inner walls 72 on the static surface 74 of the actuator 1.

Thus, as can be appreciated, the spray cap actuator 1 must be oriented in a particular direction relative to the overcap 51 so that the inner support walls 53 of the overcap 51 snugly engage along the sides of the actuator 1 and/or axially abut against the base 5. In addition, as discussed above the outer support walls 57 which also depend downwards inside of the overcap 51, and may include the lower lip 63 which has a snap fit, or frictionally biased engagement with the associated slot or lip 64 formed on an outer surface of the collar 8 of the spray cap actuator 1.

This is a critically important feature of the present invention as it permits the one-piece spray actuator 1 to be inserted directly within the overcap 51 and secured therein in a frictional and snap fit manner without any part of the overcap 51 causing any vertical direct pressure on the trigger mechanism itself. These two separate, but coupled, components can therefore be packaged and sent to a bottle or manufacturing filling facility as a single unit. Furthermore, because the two parts are coupled together either by hand or via an appropriate machine, the overcap 51 and spray actuator 1 may be coupled with the corresponding filled aerosol can C and valve in a single operation. In other words, the separate processes of first attaching a spray actuator 1 to a valve on an aerosol spray can and the separate step of then covering this actuator and aerosol spray can with an overcap 51 is eliminated by the performance of these separate actions in a single step. The single step is facilitated of course by where the above described spray actuator 1 is initially securely coupled with the inner and outer support walls 53, 57 of the overcap 51 at the actuator and overcap production facility.

Figure 14:
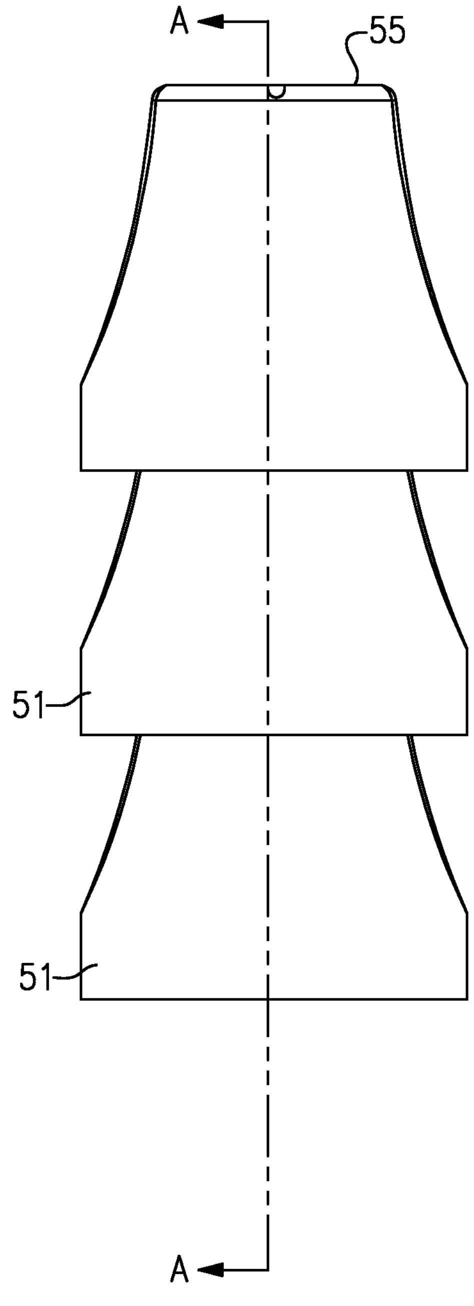
FIG. 14 is a front elevational view of a plurality of stacked actuator caps.
Figure 15:
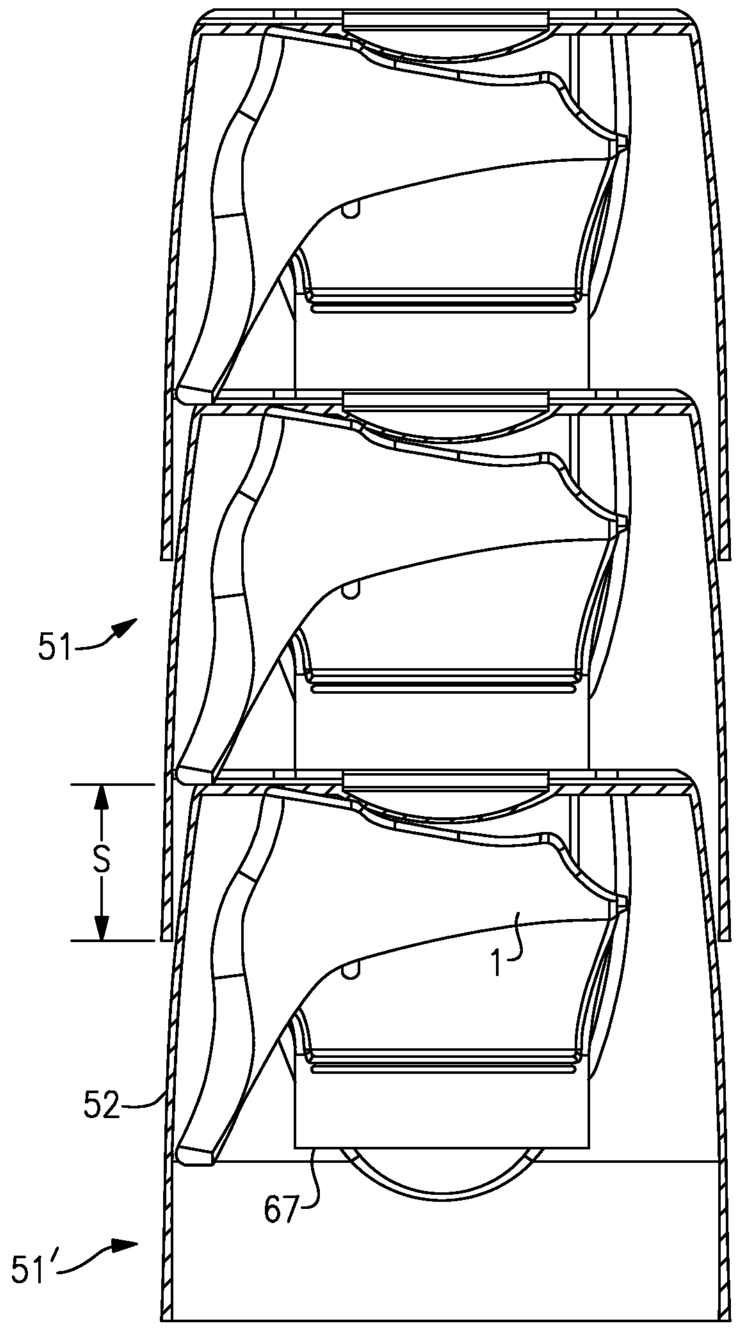
FIG. 15 is a side cross-sectional view of the plurality of stacked actuator caps in combination with the one-piece aerosol trigger spray caps.

This arrangement, where the single piece spray actuator 1 is inserted and coupled and maintained prior to attachment of these components with an aerosol can and valve is important for a number of other reasons as well. Observing FIGS. 14 and 15, we note that the particular arrangement of the spray cap actuator 1 being maintained within the interior of the overcap 51 permits these combinations of overcaps 51 and spray cap actuators 1 to be stacked, i.e., nested with respect to one another. Importantly, with the spray cap actuator 1 secured by the inner and outer support walls 53, 57 within the overcap 51, a space S is defined between a lower edge 65 of the overcap 51 and the lower most edge 67 of the collar 8 of the spray cap actuator 1. This space S allows the insertion of the upper portion including a top 55 of an adjacent overcap 51 to be inserted into an adjacent overcap 51 to abut against the lower most edge 67 of the spray cap actuator 1. Because of this vertical, i.e., axial delimiting of the space S defined between the lower edge 65 of the overcap 51 and the lower most edge 67 of the spray cap actuator 1 an adjacent, lower overcap 51' can only be inserted a particular desired distance space S within an adjacent overcap 51. This is again a critical aspect of the present invention as it specifically limits the circumferential, or radial engagement of the outer circumferential sidewalls 56 of the overcaps. Where the vertical overlap in between two adjacent overcaps is being limited by the defined space S and the lower most edges 67 of the respective spray cap actuator 1, the amount of circumferential or radial engagement between the walls of the overcap 51 can be strictly controlled.

Such stacking of actuator caps has been of particular difficulty in the industry because of the thin, malleable and flexible plastic nature of the overcaps 51. Where such overcaps 51 have been vertically stacked together in the past, because of heat, pressure, handling, etc., during transportation, the caps can become circumferentially or radially stuck together because of the interaction, malleability and plasticity of their circumferential sidewalls 69. For example where axial pressure, and heat during transportation is applied to a stack of plastic overcaps, they compress within one another leading to plastic deformation of the overcaps 51 and the circumferential sidewalls 56 attain sufficient frictional contact with one another to cause an undesired interference fit between adjacent overcaps 51,51'. Thus, generally throughout the industry, such plastic overcaps are simply thrown in a box and shipped in a haphazard conglomeration and are not generally stacked. Such sticking together or interference fits between such overcaps presents a substantial problem for any machinery which must take the caps and then in a loading mechanism add the caps to any aerosol can and valve. Sufficient interference fit will in fact lead to complete failure of the loading mechanism and manufacturing process. The above described axial limits defines an arrangement which eliminates the ability of the sidewalls 56 to circumferentially form an undesired interference fit i.e., become stuck together, and therefore stacking of these caps and actuators becomes desirable for purposes of more efficient packaging, transportation and also being able to specifically and easily being able to count the number of overcaps 51 and actuators 1 which are shipped in any particular package or container.

Because the spray cap actuator 1 of the above disclosed embodiments is all one-piece, where the spray cap actuator 1 is manufactured in a neutral position as shown for example in FIG. 4, upon completion of the molding process, a bar, roller or other mechanical device may be used to mechanically close the trigger portion 3 over the trigger support 20 and insert the down tube 7 into the central opening 9. This machine or mechanized operation occurs during or prior to ejection of the actuator 1 from the mold. Thus, even before any manual handling of the part is necessary an operable spray cap actuator 1 is molded and closed and ready to be placed, possibly inserted in an associated overcap 51 to be eventually placed on a product aerosol can C.

Since certain changes may be made in the above described improved spray cap actuator 1 without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A one-piece finger trigger spray cap actuator (1) for use in conjunction with a mounting cup (M) on an aerosol container, wherein the improvement to the actuator comprising:

a base (5) having an integral collar (8), a V-shaped finger trigger support (22) having sloping sides (27); a finger trigger (3) hingedly and integrally connected to the trigger support (22) by a living hinge (10); and a finger grip (39) depending from the finger trigger (3) and extending radially beyond the outer circumference of the collar (8);

wherein the sloping slides (27) form a down tube guide (23) as further defined by a guide surface (24) for facilitating the assembly of the trigger spray cap actuator (1) by guiding the entry of the down tube (7) into a central passage (9); and an operable state wherein the central passage (9) formed through the base (5) circumferentially engages a substantially complimentary shaped integral down tube (7) depending from the finger trigger (3), to maintain the down tube (7) in the operable state.

2. The one-piece finger trigger spray cap actuator (1) as recited in claim 1 wherein a portion of the trigger support (22) is provided with means for guiding the relative motion of the finger trigger (3) in a substantially axial manner.

3. The one-piece finger trigger spray cap actuator (1) as recited in claim 1 wherein the finger grip (39), finger trigger (3), trigger support (22), collar (8), down tube and product passage are molded as a contiguous connected article.

4. The one-piece finger trigger spray cap actuator (1) as recited in claim 1 wherein the trigger spray cap actuator (1) has an unbiased initial position wherein the down tube (7) is spaced from the central passage (9) and an operable position wherein the down tube (7) is engaged within the central passage (9) and a spring bias is provided to the finger trigger (3) by the living hinge (10) connecting the finger trigger (3) to the trigger support (22).

5. A trigger spray cap actuator (1) wherein the improvement to the actuator comprising:

a base portion (5), a trigger (3) hingedly connected to the base portion (5) by a living hinge (10), the base portion comprising a V-shaped support (22) and a collar (8) for being supported on a mounting cup (M) of a container (C) and the base (5) defining a central passage (9) through the base; the trigger (3) comprising a product outlet passage (35) for connecting directly with a valve stem (V) situated in the mounting cup (M) and an outlet orifice; and the trigger (3) further comprises a depending down tube (7) having an inlet for engaging with the valve stem (V), the inlet communicating with the product outlet passage (35) to permit the flow of fluid therethrough; and wherein the V-shaped support facilitates the positioning of the down tube (7) within the central passage and in an operative state the depending down tube (7) passes through the complimentary shaped central passage (9) in the base (5) and is substantially circumferentially engaged by the central passage (9) to substantially reduce radial movement of the depending down tube (7) while facilitating vertical movement of the down tube (7) relative to the central passage (9).

6. The finger trigger spray cap actuator (1) as recited in claim 5 further comprising a separate nozzle piece (41) which is inserted into the outlet orifice to dispense a product in a desired manner.

7. A method of manufacturing a finger trigger spray cap actuator (1), wherein the improvement to the method comprising the steps of:

integrally molding a base portion (5) and finger trigger portion (3) as a single unit about a living hinge (10), the base portion (5) comprising a collar (8) for being supported on a mounting cup (M) of a container (C) and an integral V-shaped trigger support (22) defining a central passage (9) through the base portion (5); and forming a product outlet passage (35) and an outlet orifice in the finger trigger portion (3) for connecting directly with a valve stem (V) situated in the mounting cup (M);

forming a downwardly depending down tube (7) having the outlet passage (35) formed therein in the finger trigger portion (3) and forming a downwardly depending finger trigger (39) extending beyond an outer radius of the collar and below the lower circumferential edge of the collar (8) so as to provide appropriate leverage for rotation of the finger trigger (39) about the living hinge (10); and guiding the down tube (7) along the V-shaped trigger support (22) and inserting the down tube (7) through a complimentary shaped passage (9) in the base portion (5) of the finger trigger spray cap actuator (1) and frictionally retaining the down tube (7) in the passage (9).

8. The method of manufacturing a finger trigger spray cap actuator (1) as recited in claim 7 further comprising the step of inserting the down tube (7) through the passage (9) in the base portion (5) of the finger trigger spray cap actuator (1) prior to engaging the finger trigger spray cap actuator (1) with a product package.

9. The method of manufacturing a finger trigger spray cap actuator (1) as recited in claim 7 further comprising the step of forming the down tube (7) and the complimentary shaped passage (9) substantially as cylinders.

10. The one-piece finger trigger spray cap actuator (1) as recited in claim 5 wherein the down tube (7) and the complimentary shaped passage (9) are substantially cylindrically shaped.

11. The finger trigger spray cap actuator (1) as recited in claim 1 wherein the down tube (7) and the complimentary shaped passage (9) are substantially cylindrically shaped.

* * * * *